United States Patent
Jung et al.

(10) Patent No.: US 6,780,914 B2
(45) Date of Patent: Aug. 24, 2004

(54) FLAME RETARDANT POLYPROPYLENE RESIN COMPOSITION

(75) Inventors: In-Sik Jung, Taejon (KR); Man-Seang Her, Taejon (KR); Jong-Su Hong, Taejon (KR); Sung-Man Lee, Taejon (KR)

(73) Assignee: Samsung General Chemicals Co., Ltd., Chungcheongnam (KR)

( * ) Notice: Subject to any disclaimer, the term of this patent is extended or adjusted under 35 U.S.C. 154(b) by 0 days.

(21) Appl. No.: 10/169,288
(22) PCT Filed: Dec. 20, 2000
(86) PCT No.: PCT/KR00/01496
§ 371 (c)(1),
(2), (4) Date: Nov. 4, 2002
(87) PCT Pub. No.: WO01/49787
PCT Pub. Date: Jul. 12, 2001

(65) Prior Publication Data
US 2003/0130394 A1 Jul. 10, 2003

(30) Foreign Application Priority Data
Dec. 30, 1999 (KR) .......... 1999-65870

(51) Int. Cl.$^7$ .......... C08K 3/22; C08K 3/26; C08K 3/32; C08K 5/03; C08K 23/12
(52) U.S. Cl. .......... 524/412; 524/416; 524/424; 524/436; 524/437; 524/464; 524/465; 524/466; 524/469
(58) Field of Search .......... 524/412, 416, 524/424, 436–437, 464–466, 469

(56) References Cited

U.S. PATENT DOCUMENTS

| 4,730,029 A | | 3/1988 | Wachi et al. .......... 526/249 |
| 5,760,120 A | * | 6/1998 | Itoh et al. .......... 524/431 |

FOREIGN PATENT DOCUMENTS

| JP | 58-093711 | 6/1983 |
| JP | 61-152754 | 7/1986 |
| JP | 61-247746 | 11/1986 |
| JP | 64-031854 | 2/1989 |
| JP | 03-265639 | 11/1991 |
| JP | 06-184372 | 7/1994 |

OTHER PUBLICATIONS

International Search Report, Published Apr. 11, 2001.

* cited by examiner

Primary Examiner—Peter Szekely
(74) Attorney, Agent, or Firm—Meyertons, Hood, Kivlin, Kowert & Goetzel, P.C.; Eric B. Meyertons

(57) ABSTRACT

The present invention provides a flame retardant resin composition, or more particularly, a flame retardant polypropylene resin composition which comprises polypropylene having improved flow melt characteristics, flame retardants, a flame retardant aid, and a tetrafluoroethylene polymer. The composition of the present invention has high melt tension, without deterioration of the mechanical properties of flame retardant polypropylene, and drastically enhanced characteristics of shape maintenance and a flaming drip during burning.

14 Claims, No Drawings

FLAME RETARDANT POLYPROPYLENE RESIN COMPOSITION

TECHNICAL FIELD

The present invention relates to a flame retardant resin composition, or more particularly, to a flame retardant polypropylene resin composition which comprises polypropylene having improved flow melt characteristics, flame retardants, a flame retardant aid, and a tetrafluoroethylene polymer. The resin composition of the present invention has high melt tension, without deterioration of the mechanical properties of flame retardant polypropylene, and drastically enhanced characteristics of shape maintenance and flaming drip during burning.

BACKGROUND ART

As for the conventional resins used in electrical products, non-combustible, flame-retardant, or self-extinguishing resins are used for the purposes of preventing ignition, combustion or fire, which may be caused by various electrical troubles therein. In this regard, since olefin-based resins made from hydrocarbons(i.e., polypropylene) have excellent impactability, rigidity, appearance and moldability, various proposals have been made relating to flame retardancy of these resins. In particular, according to the standards of flame retardancy of electrical products, the UL specifications (UL94) of the US require a high level of flame retardancy, depending on the products and the parts. The products to be exported to the US are required to be made from materials deemed to be appropriate according to the UL specifications. In response to these requirements, researchers have developed a material of thermoplastic polyolefin resins, mixed with organic and inorganic flame retardants, and a flame retardant aid. However, the material is problematic in that it suffers from the occurrence of a flaming drip. To solve this problem, a flame retardant resin composition was proposed, wherein said composition comprises 30~80 wt % of polypropylene; 5~25% of polyethylene having a melt flow rate of 0.01~2.0 g/10 minutes (190° C., 21.18N); 10~35 wt % of an inorganic fillers selected from the group consisting of powder talc, kaoline, mica, and silica; and 3~35 wt % of decabromodiphenylether and/or dodecachloro decahydrodimetabibenzocyclocutene (Japanese Patent Publication No. Sho 55-30739). In the above patent, it was reported that polyethylene acts in effect to facilitate the melt flow drip therein during burning. However, with respect to the composition as such, if the melt flow rate (MFR, 190° C.; 21.18N) of polyethylene is low, there is a problem of insufficiency in even dispersion of polypropylene-based flame retardant resins. For this reason, an increase in melt tension is not seen, with insubstantial effects on the improvement of the properties of shape maintenance and a flaming drip. Consequently, if the amount of polyethylene in the composition is 5 wt % or less, a proper melt-drip characteristic is not obtained. Conversely, if the amount in the composition increases, the temperature of thermal deformation, rigidity, etc. deteriorate. Moreover, the superior characteristics of polypropylene are lost.

Moreover, as for the method of increasing melt tension or the temperature of crystallization of a polypropylene composition, there are several methods as follows: a method of reacting organic peroxides and cross-linking agents to crystalline polypropylene in the molten state (Japanese Patent Laid-Open Nos. Sho 58-93711, Sho 61-152754, etc.); and a method of producing polypropylene having free monomer chain branches without gel by reacting semi-crystalline polypropylene with a peroxide of a low decomposition temperature in the absence of oxygen (Japanese Patent Laid-Open No. Pyung 2-298536). In addition, as for the other methods of enhancing melt visco-elasticity (e.g., melt tension), researcher have proposed a composition of a mixture of polyethylene or polypropylene of different specific viscosities or molecular weights, or a method of obtaining such a composition by means of multi-step polymerization. For example, the following methods have been proposed: a method of extrusion in the temperature range of the melting point to 210° C. after adding 2~30 weight parts of polypropylene of ultra-high molecular weight to 100 weight parts of commonly-used polypropylene (Japanese Patent Publication No. Sho 61-28694); a method of multi-step polymerization, yielding an extrusion sheet which comprises two components of polypropylenes of different molecular weights, having a limiting viscosity number ratio of 2 or higher (Japanese Patent Publication No. Pyung 1-12770); a method involving a polymer of 1~10 wt % of polyethylene of low viscosity; a method of melt-mixing three types of polyethylenes of different viscosities and molecular weights; a method of multi-step polymerization of polyethylene of ultra-high molecular weight having limiting viscosity number of 20 dl/g or higher, wherein less than 0.05~1 wt % of the polyethylene is obtained(Japanese Patent Publication No. Pyung 5-79683); and a method of multi-step polymerization of less than 0.05~1 wt % of polyethylene of ultra-high molecular weight having limiting viscosity number of 15 dl/g or higher by means of using 1-butene or 4-methyl by way of a polymerizer of a specific alignment, wherein (Japanese Patent Publication No. Pyung 7-8890).

With respect to the various compositions or the methods of preparation thereof as proposed in prior art, those methods enhance melt tension of polyolefin to a certain extent. However, there are problems of inadequacy of recycling usability with those cross-linked compositions in addition to the problems of low rigidity at high temperature. Furthermore, with respect to those using polyethylene of high viscosity, there are many factors which need improvements: e.g., an increase in electricity consumption due to an increase in current load at the motor of a molding machine, limitation in productivity, and low thermal stability. Moreover, with respect to the method of preparing polyolefin polymers of high molecular weights, according to said method of multi-step polymerization, it is difficult to control a low polymerization level in olefin (co)-polymerization for producing a small amount of polyolefin of high molecular weight In addition, it requires low polymerization temperature for producing polyolefin of sufficiently high molecular weight. The method also requires reconstruction of the process, which all leads to lowering of productivity of polyolefin.

In the end, with respect to the prior art as mentioned above, it brings about insufficient enhancement in terms of melt tension of polypropylene and its crystallization temperature. In particular, a composition having superior rigidity and moldability has not been developed as of yet, which simultaneously satisfies the characteristics of shape maintenance, and a flaming drip or melt drip at the time of burning of a flame retardant polypropylene resin composition comprising a halogen-based flame retardant.

DISCLOSURE OF INVENTION

In solving these problems as mentioned above, the objective of the present invention lies in providing a flame retardant polypropylene resin composition having improved characteristics of shape maintenance and a flaming drip.

The flame retardant polypropylene resin composition of the present invention comprises (A) a polypropylene resin having a melt flow rate (hereinafter MFR) of 1.5~40 g/10 minutes at 230° C. and a 2.16 kg load; (B) at least one of flame retardants and a flame retardant aid; and (C) 0.10~3 wt % of a tetrafluoroethylene polymer.

With respect to the flame retardant polypropylene resin composition of the present invention, the polypropylene resin refers to a propylene α-olefin block copolymer having 50 wt % or more of propylene polymer units or a propylene homopolymer. In other words, the polypropylene resin used in the present invention refers to a crystalline polypropylene homopolymer, or a copolymer of propylene and one or more compounds selected from the group consisting of 1-butene, 1-pentene, 1-hexene, 4-methylpentene, 1-heptene, 1-octene, and 1-decene. The melt flow rate of the polypropylene resin should be 1.5~40 g/10 minutes, or preferably 2~40 g/10 minutes. If the melt flow rate is less than 1.5 g/10 minutes, the injection molding of a thin product becomes rather difficult, which is not preferable. If the melt flow rate exceeds 40 g/10 minutes, the melt viscosity is low, and consequently it does not display the drop preventing effect of the molten material, which is characteristic due to tetrafluoroethylene. In this regard, a V0 grade of flame retardancy according to the UL specifications cannot be obtained.

With respect to the stereo-specificity of the polypropylene resin used in the present invention, it can be of any polypropylene without specific limitations as long as it is crystalline. In particular, a crystalline polypropylene resin can be used, wherein its isotactic pentad ratio measured with $^{13}$C-NMR (Nuclear Magnetic Resonance Spectrum) is 0.80~0.99, or preferably 0.85~0.99. In particular, a crystalline polypropylene resin of 0.90~0.99 of isotactic pentad ratio can be preferably used.

With respect to the flame retardant polypropylene resin composition of the present invention, at least one of flame retardants is selected from the group of inorganic compounds such as magnesium hydroxide, hydrotalcite, and ammonium polyphosphate, etc.; and the group of halogenated compounds such as decabromodiphenylether, ethylene-bis(tetrabromophthalimide), bispentabromophenoxyethane, tetrabromo bisphenyl A-bis (2,3-dibromopropylether), bis{(3,5-dibromo-4-(2',3'-dibromopropyloxy))phenyl}sulfone, etc. For the purpose of achieving the effect of flame retardancy, the amount of flame retardants is preferably 10~30 wt % of the composition.

With respect to the polypropylene resin composition of the present invention, commonly-used flame retardant aids may be used, or preferably antimony oxide can be used. For example, antimony trioxide, or antimony pentoxide or the mixture thereof can be used. For the purpose of achieving the effect of flame retardancy, the amount of the flame retardant aid is preferably 5~10 of the composition.

With respect to the flame retardant polypropylene resin composition of the present invention, an appropriate tetrafluoroethylene polymer is a polymer containing 65~76 wt %, or preferably 70~76 wt %, of fluorine. In addition to the homopolymers of tetrafluoroethylene, for the same purpose as mentioned above, one can use a copolymer of other monomers containing fluorine and tetrafluoroethylene, or a copolymer of tetrafluoroethylene and ethylenically unsaturated monomers, capable of copolymerization, without fluorine. The tetrafluoroethylene polymer may be present to the extent of 0.10~3 wt %, or preferably 1.5~2 wt % of the resin composition of the present invention. Upon addition of this component therein, tetrafluoroethylene exists in the fibril form during the molding process of the resin composition consequently it has the effect of preventing molten materials from dropping, at the time of the burning of the molded materials As for the tetrafluoroethylene polymer used in the present invention, it is preferable to use a polymer in the form of powder or solid. The method of producing a tetrafluoroethylene polymer is well know as proposed for example in Houden-Wey, Metrodender Organischem Chmie, Volum 14/1, pg. 842~849 (Stuttgart 1961). The addition of a tetrafluoroethylene polymer in the composition according to the present invention reduces the amount of flame retardants necessary therein and consequently it enhances the mechanical properties of the products produced from the composition of the present invention. Moreover, by adding a tetrafluoroethylene polymer, it prevents molded bodies from burning during dripping of the combustible particles. For obtaining the effect of flame retardancy therein, the amount of a tetrafluoroethylene polymer is preferably 0.10~3 wt %, and the amount of fluorine contained in the tetrafluoroethylene polymer is preferably 65~76 wt %. If the amount of fluorine in tetrafluoroethylene polymer is less than 65 wt %, or more than 76 wt %, the effect of flame retardancy is not quite sufficient.

In addition to the above components, within the scope not deviating the purposes of the present invention, conventional additives such as inorganic fillers and antioxidants can be added to the flame retardant polypropylene resin composition.

The present invention is described in detail by examples as follows.

BEST MODE FOR CARRYING OUT THE INVENTION

The assessment for flame retardancy in the present invention was based on the vertical burning tests carried out along vertically according to the "Tests for Flammability of Plastic Materials for Parts in Devices and Appliances" of UL Subject 94 (Underwriters Laboratories, Inc.). The thicknesses of the test section pieces used therein were 1/16 and 1/32 inch, respectively.

The compositions produced by the present invention were classified as UL94 V0 when they satisfied the following standards: A set of five test pieces with respective measurements of 127×12.7×1.6 mm was placed directly in contact with the flame (height of 19 mm). There were two contacts, respectively, which were maintained for ten seconds. Then, after ten or more seconds of flame burning, none of the test pieces should burn. For applying the flame to the set of five test pieces for ten times, the total duration of flame burning must not exceed 50 seconds. None of the test pieces should drop flame particles. None of the test pieces should burn in flame to the point of the clamp's grip or burn further thereafter. After removing the test flame for the second time, none of the test pieces should undergo sustained burning for more than 30 seconds.

To be classified as UL94 V1, the duration of flame burning per test piece must not exceed more than 30 seconds. Moreover, with respect to applying the flame to the set of five test pieces for ten times, it requires that the total duration of flame burning to be not longer than 250 seconds. There, the burning must not sustain for more than 60 seconds. Other standards are the same as the conditions as mentioned above.

Those test pieces dropping flame particles while satisfying the other standards for classifying them to UV94 V1 were classified as UL94 V2.

EXAMPLE 1

6.6 kg of crystalline polypropylene homopolymer (as a polypropylene resin) having a melt flow rate (the melt flow amount of molten resin for 10 minutes at 230° C. with a 2.16 kg load) of 12 g/10 minutes, 2.2 kg of decabromodiphenyl ether (S-102E produced by Albermaler Corporation), 700 g of antimony trioxide (Sb203 produced by Cheil Flame Retardant, Ltd. at 1.2 μm), 500 g of talc (KCN5200 produced by KOCH, Inc.), 40 g of polytetrafluoroethylene (7AJ produced by Dupont, Inc.), 10 g of calcium stearate, 10 g of antioxidant (1010 produced by CIBA-GEIGY, Inc.), and 20 g of IRGAFOS 168 (produced by CIBA GEIGY, Inc.) were added to a Hensel mixer and mixed therein for three minutes. By using a two-axis extruder with a diameter of 30 mm, the composition as produced was molten and extruded into pellets at 190° C. The yielded pellets were dried for three hours at 100° C. Then, they were molded by using an injection-molding machine with the maximum temperature of a cylinder fixed at 200° C. to provide test pieces for testing of flame retardancy. Then, the test pieces were tested for measuring flame retardancy, the results of which are shown in Table 1.

EXAMPLES 2~4 AND COMPARATIVE EXAMPLES 1~3

Except for substituting the amount of a tetrafluoroethylene polymer as an agent for improving the characteristic of a flaming drip in a composition with the amounts shown in Table 1, the pellets were produced under the same conditions as those mentioned in Example 1. Then, the yielded pellets were molded by using an injection-molding machine to provide the test pieces, and the test pieces were tested for measuring flame retardancy, the results of which are shown in Table 1.

With respect to the flame retardancy of the resin compositions of Examples 1~4 and Comparative Examples 1~3, as shown in Table 1, when a tetrafluoroethylene polymer was added as an agent for improving the characteristic of a flaming drip, the shape maintenance of the molten materials was excellent. Moreover, the molten materials dropping thereto, which may cause ignition at the cotton wool laid 30 cm below the test piece, were non-existence during burning. In short, they showed flame retardancy of UL V0. However, when the amount of a tetrafluoroethylene polymer in the composition was 5 wt % or more, there were no further effects on the characteristics of a flaming drip.

EXAMPLE 5

6.6 kg of crystalline polypropylene homopolymer (as a polypropylene resin) having a melt flow rate (the melt flow amount of molten resin for 10 minutes at 230° C. with a 2.16 kg load) of 12 g/10 minutes, 2.2 kg of decabromodiphenyl ether (S-102E produced by Albermaler Corporation), 700 g of antimony trioxide (Sb203 produced by Cheil Flame Retardant, Ltd. at 1.2 μm), 300 g of talc (KCN5200 produced by KOCH, Inc.), 40 g of polytetrafluoroethylene (7AJ produced by Dupont, Inc.), 10 g of calcium stearate, 10 g of antioxidant (1010 produced by CIBA-GEIGY, Inc.), and 20 g of IRGAFOS 168 (produced by CIBA GEIGY, Inc.) were added to a Hensel mixer and mixed therein for three minutes. By using a two-axis extruder with a diameter of 30 mm, the composition as produced was melted and extruded into pellets at 190° C. The yielded pellets were dried for three hours at 100° C. Then, they were molded by using an injection-molding machine with the maximum temperature of a cylinder fixed at 200° C. to provide test pieces for testing of flame retardancy. Then, the test pieces were tested for measuring flame retardancy, the results of which are shown in Table 1.

EXAMPLES 6~8 AND COMPARATIVE EXAMPLES 4~6

Except for substituting the amount of talc as an inorganic filler and the amount of tetrafluoroethylene polymer in a composition with the amounts shown in Table 1, the pellets were produced under the same conditions as those mentioned in Example 5. Then, the yielded pellets were molded by using an injection-molding machine to provide the test pieces, and the test pieces were tested for measuring flame retardancy, the results of which are shown in Table 1.

As shown in Table 1, with respect to the flame retardancy of the resin compositions of Examples 5~8 and Comparative Examples 4~6, in cases of adding tetrafluoroethylene polymer as an agent for improving the characteristics of a flaming drip, the shape maintenance of molten materials in such a state was possible even if the amount of talc as an inorganic filler was 3 wt % or lower. There were no molten materials dropping during burning, which may cause ignition at the cotton wool laid 30 cm below the test piece. In short, the flame retardancy of UL94 V0 were achieved in these cases. In cases of not adding tetrafluoroethylene polymer, if the amount of talc in the composition was 20 wt % or less, the flame retardancy of UL94 V0 could not be obtained due to ignition by way of a flaming drip during burning.

EXAMPLE 9

6.3 kg of crystalline polypropylene homopolymer (as a polypropylene resin) having a melt flow rate (the melt flow amount of molten resin for 10 minutes at 230° C. with a 2.16 kg load) of 12 g/10 minutes, 2.4 kg of decabromodiphenyl ether (S-102E produced by Albermaler Corporation), 800 g of antimony trioxide (Sb203 produced by Cheil Flame Retardant, Ltd. at 1.2 μm), 500 g of talc (KCN5200 produced by KOCH, Inc.), 40 g of polytetrafluoroethylene (7AJ produced by Dupont, Inc.), 10 g of calcium stearate, 10 g of antioxidant (1010 produced by CIBA-GEIGY, Inc.), and 20 g of IRGAFOS 168 (produced by CIBA GEIGY, Inc.) were added to a Hensel mixer and mixed therein for three minutes. By using a two-axis extruder with a diameter of 30 mm, the composition as produced was molten and extruded into pellets at 190° C. The yielded pellets were dried for three hours at 100° C. Then, they were molded by using an injection-molding machine with the maximum temperature of a cylinder fixed at 200° C. to provide the test pieces for testing of flame retardancy. Then, the test pieces were tested for measuring flame retardancy, the results of which are shown in Table 1.

EXAMPLES 10~14 AND COMPARATIVE EXAMPLES 7~16

Except for substituting the amounts and the types of flame retardants, flame retardant aids, and talc in a composition with those shown in Table 1, the pellets were produced under the same conditions as those mentioned in Example 9. Then, the yielded pellets were molded by using an injection-molding machine, and the test pieces were produced for measuring flame retardancy, the results of which are shown in Table 1.

As shown in Table 1, with respect to the flame retardancy of the resin compositions of Examples 9~14 and Comparative Examples 7~16, in cases of adding tetrafluoroethylene polymer as an agent for improving the characteristics of a flaming drip, the shape maintenance of molten materials, irrespective of the types of flame retardants, was excellent with respect to the flame retardancy tests. There were no molten materials dropping during burning, which may cause ignition at the cotton wool laid 30 cm below the test piece. In short, the flame retardancy of UL94 V0 were achieved in these cases.

EXAMPLE 15

6.8 kg of crystalline polypropylene homopolymer (as a polypropylene resin) having a melt flow rate (the melt flow amount of molten resin for 10 minutes at 230° C. with a 2.16 kg load) of 1.5 g(10 minutes, 2.2 kg of decabromodiphenyl ether (S-102E produced by Albermaler Corporation), 700 g of antimony trioxide (Sb203 produced by Cheil Flame Retardant, Ltd. at 1.2 μm), 500 g of talc (KCN5200 produced by KOCH, Inc.), 40 g of polytetrafluoroethylene (7AJ produced by Dupont, Inc.), 10 g of calcium stearate, 10 g of antioxidant (1010 produced by CIBA-GEIGY, Inc.), and 20 g of IRGAFOS 168 (produced by CIBA GEIGY, Inc.) were added to a Hensel mixer and mixed therein for three minutes. By using a two-axis extruder with a diameter of 30 mm, the composition as produced was molten and extruded into pellets at 190° C. The yielded pellets were dried for three hours at 100° C. Then, they were molded by using an injection-molding machine with the maximum temperature of a cylinder fixed at 200° C. to provide the test pieces for testing of flame retardancy. Then, the test pieces were tested for measuring flame retardancy, the results of which are shown in Table 2.

EXAMPLES 16~17 AND COMPARATIVE EXAMPLES 17~18

Except for substituting the polyethylene resins with those with the melt flow rates as shown in Table 2, the pellets were produced under the same conditions as those mentioned in Example 15. Then, the yielded pellets were molded by using an injection-molding machine, and the test pieces were tested for measuring flame retardancy, the results of which are shown in Table 2.

As shown in Table 2, with respect to the flame retardancy of the resin compositions of Examples 15~17 and Comparative Examples 17~18, even with the polyethylene resins with the melt flow rates in the broad range of 1.5~40 g/10 minutes, the characteristics of a flaming drip could be enhanced However, if it was 0.5 g/10 minutes or lower, the extrusion load at the time of the secondary processing was very high, with ensuing difficulties in even dispersion of flame retardants. In this regard, the flame retardancy of UL94 V0 could not be obtained in these cases. Moreover, if the melt flow rate was 60 g/10 minutes or more, the melting point of the substrate resin became too low in itself, and consequently it could not suppress the production of combustible molten materials dropping thereto. In short, it led to difficulties in obtaining flame retardancy of UL94 V0

TABLE 1

| Type | (A)-1 | (B)-1 | (B)-2 | (B)-3 | (B)-4 | (B)-5 | (C) | (D) | (E) | 1/16" Flame Drip | 1/16" Flame Retardancy | 1/32" Flame Drip | 1/32" Flame Retardancy |
|---|---|---|---|---|---|---|---|---|---|---|---|---|---|
| E1 | 66 | 22 | — | — | — | — | 7 | 5 | 0.40 | ND | V0 | ND | V0 |
| E2 | 66 | 22 | — | — | — | — | 7 | 5 | 0.10 | ND | V0 | ND | V0 |
| E3 | 66 | 22 | — | — | — | — | 7 | 5 | 2.00 | ND | V0 | ND | V0 |
| E4 | 66 | 22 | — | — | — | — | 7 | 5 | 3.00 | ND | V0 | ND | V0 |
| CE1 | 66 | 22 | — | — | — | — | 7 | 5 | 0.00 | DB | V2 | DB | V2 |
| CE2 | 66 | 22 | — | — | — | — | 7 | 5 | 0.05 | DB | V2 | DB | V2 |
| CE3 | 66 | 22 | — | — | — | — | 7 | 5 | 5.00 | ND | V1 | ND | V1 |
| E5 | 68 | 22 | — | — | — | — | 7 | 3 | 0.40 | ND | V0 | ND | V0 |
| E6 | 66 | 22 | — | — | — | — | 7 | 5 | 0.40 | ND | V0 | ND | V0 |
| E7 | 61 | 22 | — | — | — | — | 7 | 10 | 0.40 | ND | V0 | ND | V0 |
| E8 | 51 | 22 | — | — | — | — | 7 | 20 | 0.40 | ND | V0 | ND | V0 |
| CE4 | 61 | 22 | — | — | — | — | 7 | 10 | 0.00 | DB | V2 | DB | V2 |
| CE5 | 51 | 22 | — | — | — | — | 7 | 20 | 0.00 | DB | V2 | DB | V2 |
| CE6 | 41 | 22 | — | — | — | — | 7 | 30 | 0.00 | D | V0 | ND | V0 |
| E9 | 63 | 24 | — | — | — | — | 8 | 5 | 0.40 | ND | V0 | ND | V0 |
| E10 | 59 | 27 | — | — | — | — | 9 | 5 | 0.40 | ND | V0 | ND | V0 |
| E11 | 64 | — | 24 | — | — | — | 7 | 5 | 0.40 | ND | V0 | ND | V0 |
| E12 | 62 | — | — | 25 | — | — | 8 | 5 | 0.40 | ND | V0 | ND | V0 |
| E13 | 82 | — | — | — | 12 | — | 6 | — | 0.40 | D | V0 | D | V0 |
| E14 | 82 | — | — | — | — | 12 | 6 | — | 0.40 | D | V0 | D | V0 |
| CE7 | 63 | 24 | — | — | — | — | 8 | 5 | 0.00 | DB | V2 | DB | V2 |
| CE8 | 59 | 27 | — | — | — | — | 9 | 5 | 0.00 | D | V2 | D | V2 |
| CE9 | 63 | — | 24 | — | — | — | 8 | 5 | 0.00 | DB | V2 | DB | V2 |
| CE10 | 59 | — | 27 | — | — | — | 9 | 5 | 0.00 | D | V0 | DB | V2 |
| CE11 | 62 | — | — | 25 | — | — | 8 | 5 | 0.00 | DB | V2 | DB | V2 |
| CE12 | 50 | — | — | 27 | — | — | 8 | 15 | 0.00 | D | V0 | DB | V2 |
| CE13 | 82 | — | — | — | 12 | — | 6 | — | 0.00 | DB | V2 | DB | V2 |
| CE14 | 79 | — | — | — | 14 | — | 7 | — | 0.00 | DB | V2 | D | V0 |
| CE15 | 82 | — | — | — | — | 12 | 6 | — | 0.00 | DB | V2 | DB | V2 |
| CE16 | 79 | — | — | — | — | 14 | 7 | — | 0.00 | DB | V2 | D | V0 |

TABLE 2

(UNIT: 100 g)

| Type | (A)-2 | (A)-3 | (A)-4 | (A)-5 | (A)-6 | (B)-1 | (C) | (D) | (E) | 1/16" Drip | 1/16" Flame Retardancy | 1/32" Drip | 1/32" Flame Retardancy |
|------|-------|-------|-------|-------|-------|-------|-----|-----|-----|------|------------|------|------------|
| E15  | 68    | —     | —     | —     | —     | 22    | 7   | 5   | 0.40 | ND | V0 | ND | V0 |
| E16  | —     | 68    | —     | —     | —     | 22    | 7   | 5   | 0.40 | ND | V0 | ND | V0 |
| E17  | —     | —     | 68    | —     | —     | 22    | 7   | 5   | 0.40 | ND | V0 | ND | V0 |
| CE17 | —     | —     | —     | 68    | —     | 22    | 7   | 5   | 0.40 | DB | V2 | DB | V2 |
| CE18 | —     | —     | —     | —     | 68    | 22    | 7   | 5   | 0.40 | ND | V1 | ND | V1 |

*Note:
E: Example
CE: Comparative Example
ND: Non-Drip (Molten materials do not drop)
D: Drip (Molten materials drop but causing no burning of cotton)
DB: Drip-Burning (Combustible molten materials drop, causing burning of cotton)
(A)-1: HJ500 (Propylene homopolymer, MFR = 12)
(A)-2: HY200 (Propylene homopolymer, MFR = 1.5)
(A)-3: BJ500 (Propylene ethylene bloc copolymer, MFR = 12)
(A)-4: BJ800 (Propylene ethylene bloc copolymer, MFR = 40)
(A)-5: BJ920 (Propylene ethylene bloc copolymer, MFR = 60)
(A)-6: BB110 (Propylene ethylene bloc copolymer, MFR = 0.5)
(B)-1: S-102E (decabromodiphenylether, produced by Albermarle, Inc.)
(B)-2: S-8010 (bis-pentabromophenoxy ethane, produced by Albermarle, Inc.)
(B)-3: BT-93 (ethylene-bis(tetrabromophthalamide, produced by Albermarle, Inc.)
(B)-4: PE-68 (tetrabromobisphenol A- bis (2,3-dibromopropylether, produced by Great Lakes, Inc.)
(B)-5: Nonnen52 (bis ((3,5-dibromo-4-(2',3'-dibromopropyloxy))phenyl)sulfone, produced by Marubishi, Ltd.)
(C): Antimony trioxide SB- W (produced by Ilsung Flame Retardant, Ltd.)
(D): Talc KCN5200 (produced by KOCH, Inc.)
(E): Polytetrafluoroethylene 7AJ (produced by Dupont, Inc.)

As shown above, as compared to the conventional flame retardant polypropylene resin compositions, the flame retardant polypropylene resin composition produced according to the present invention displays flame retardancy of UL94 V0 by way of reducing the amount of flame retardants necessary for flame retardancy of UL94 V0 and consequently enhancing the mechanical properties of the products produced from the composition of the present invention. Moreover, irrespective of the types of flame retardants, the shape maintenance of the molten materials in the flame retardancy test is excellent, without the molten materials dropping during burning, which in turn may cause ignition at the cotton wool laid 30 cm below the test piece.

What is claimed is:

1. A flame retardant crystalline polypropylene resin composition consisting of:
    a polypropylene resin, wherein the polypropylene resin exhibits a melt flow rate of about 1.5 g to about 40 g per 10 minutes at 230° C. at a 2.16 kg load;
    one or more flame retardants, wherein an amount of flame retardants is between about 10 wt % and 30 wt % of the flame retardant polypropylene resin composition;
    a flame retardant aid, wherein an amount of the flame retardant aid is between about 5 wt % and 10 wt % of the flame retardant polypropylene resin composition; and
    a tetrafluoroethylene polymer, wherein an amount of the tetrafluoroethylene polymer is between about 0.10 wt % and 3.0 wt % of the flame retardant polypropylene resin composition.

2. The flame retardant polypropylene resin composition of claim 1, wherein the crystalline polypropylene resin comprises a polypropylene homopolymer.

3. The flame retardant crystalline polypropylene resin composition of claim 1, wherein the flame retardants comprise a mixture of one or more inorganic compounds and one or more halogenated compounds; wherein the inorganic compounds comprise magnesium hydroxide, hydrotalcite, ammonium polyphosphate, or mixtures thereof; and wherein the halogenated compounds comprise decabromodiphenylether, ethylene-bis (tetrabromphthalimide), bispentabromophenoxyethane, tetrabromobisphenyl A-bis(2,3-dibromopropylether), bis{(3,5,-dibromo-4-(2',3'-dibromoprophyloxy))phenyl}sulfone or mixtures thereof.

4. The flame retardant crystalline polypropylene resin composition of claim 1, wherein the flame retardant aid comprises antimony trioxide, antimony pentoxide, or a mixture thereof.

5. The flame retardant crystalline polypropylene resin composition of claim 1, wherein the tetrafluoroethylene polymer comprises a fluorine content between about 65 wt % and 76 wt %.

6. The flame retardant crystalline polypropylene resin composition of claim 1, wherein the polypropylene resin comprises a mixture of a copolymer and α-olefin.

7. The flame retardant crystalline polypropylene resin composition of claim 1, wherein the tetrafluoroethylene polymer comprises fluorine and carbon atoms.

8. A flame retardant crystalline polypropylene resin composition consisting of:
    a polypropylene resin, wherein the polypropylene resin exhibits a melt flow rate of about 1.5g to about 40g per 10 minutes at 230° C. at a 2.16 kg load;
    one or more flame retardants, wherein an amount of flame retardants is between about 10 wt % and 30 wt % of the flame retardant polypropylene resin composition;
    a flame retardant aid, wherein an amount of the flame retardant aid is between about 5 wt % and 10 wt % of the flame retardant polypropylene resin composition;
    a tetrafluoroethylene polymer, wherein an amount of the tetrafluoroethylene polymer is between about 0.10 wt % and 3 wt % of the flame retardant polypropylene resin composition; and one or more additives selected from the group consisting of inorganic fillers and antioxidants.

9. The flame retardant polypropylene resin composition of claim 8, wherein the crystalline polypropylene resin comprises a polypropylene homopolymer.

10. The flame retardant crystalline polypropylene resin composition of claim 8, wherein the flame retardants comprise a mixture of one or more inorganic compounds and one or more halogenated compounds; wherein the inorganic compounds comprise magnesium hydroxide, hydrotalcite, ammonium polyphosphate, or mixtures thereof; and wherein the halogenated compounds comprise decabromodiphenylether, ethylene-bis(tetrabromphthalimide), bispentabromophenoxyethane, tetrabromobisphenyl A-bis(2,3-dibromopropylether), bis{(3,5,-dibromo-4-(2',3'-dibromoprophyloxy))phenyl}sulfone or mixtures thereof.

11. The flame retardant crystalline polypropylene resin composition of claim 8, wherein the flame retardant aid comprises antimony trioxide, antimony pentoxide, or a mixture thereof.

12. The flame retardant crystalline polypropylene resin composition of claim 8, wherein the tetrafluoroethylene polymer comprises a fluorine content between about 65 wt % and 76 wt %.

13. The flame retardant crystalline polypropylene resin composition of claim 8, wherein the polypropylene resin comprises a mixture of a copolymer and α-olefin.

14. The flame retardant crystalline polypropylene resin composition of claim 8, wherein the tetrafluoroethylene polymer comprises fluorine and carbon atoms.

* * * * *